(12) United States Patent
Cherchali et al.

(10) Patent No.: US 7,787,455 B2
(45) Date of Patent: Aug. 31, 2010

(54) TECHNIQUE FOR AUTOMATED MAC ADDRESS CLONING

(76) Inventors: Ali Cherchali, 19 Hemlock Hill Rd., Jackson, NJ (US) 08527-1742; Marius J. Gudelis, Jr., 2 Carol Ct., Holmdel, NJ (US) 07733-2302; William G. Lester, 3 Ramsgate Rd., Cranford, NJ (US) 07016-1721; Robert J. McLaughlin, 17 Golloping Brook Rd., Allentown, NJ (US) 08501-2028

( * ) Notice: Subject to any disclaimer, the term of this patent is extended or adjusted under 35 U.S.C. 154(b) by 306 days.

(21) Appl. No.: 12/011,751

(22) Filed: Jan. 29, 2008

(65) Prior Publication Data
US 2008/0147779 A1 Jun. 19, 2008

Related U.S. Application Data

(63) Continuation of application No. 11/033,930, filed on Jan. 12, 2005, now Pat. No. 7,342,925.

(60) Provisional application No. 60/631,633, filed on Nov. 30, 2004.

(51) Int. Cl.
H04L 12/56 (2006.01)
H04J 1/16 (2006.01)

(52) U.S. Cl. ............... 370/389; 370/252; 370/254; 370/401

(58) Field of Classification Search ......... 370/252, 370/254, 389, 401, 400; 709/202
See application file for complete search history.

(56) References Cited

U.S. PATENT DOCUMENTS

| | | | |
|---|---|---|---|
| 7,068,597 B1 * | 6/2006 | Fijolek et al. | 370/230 |
| 7,139,818 B1 * | 11/2006 | Kinnear et al. | 709/222 |
| 2005/0047355 A1 * | 3/2005 | Wood et al. | 370/310 |

* cited by examiner

*Primary Examiner*—John Pezzlo

(57) ABSTRACT

In an arrangement where the device that is known to an ISP is communicating with the ISP through an interposed device that is not known to the ISP, the interposed device captures the known device's MAC address upon startup and clones the captured MAC address in all standard packets that it sends to the ISP.

9 Claims, 2 Drawing Sheets

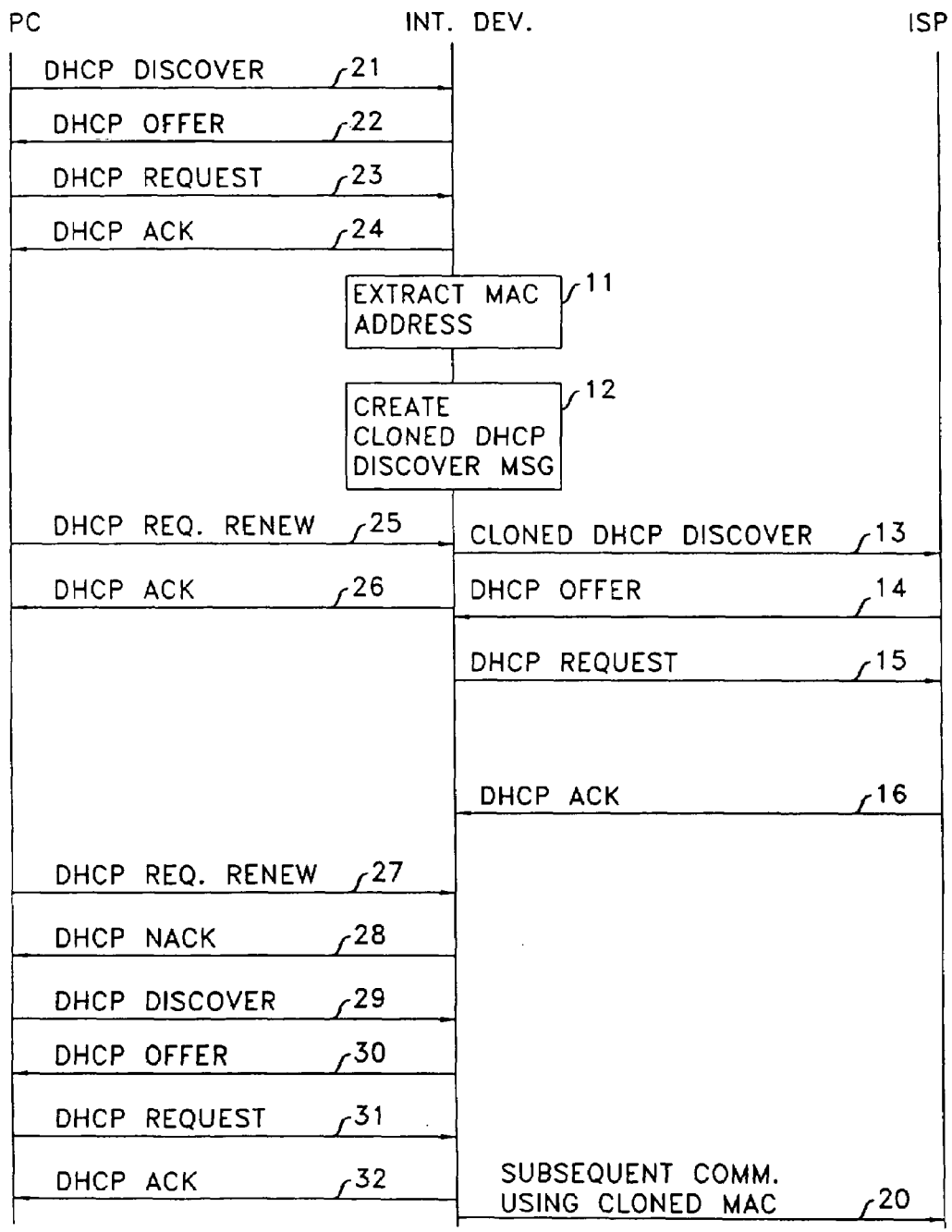

TECHNIQUE FOR AUTOMATED MAC ADDRESS CLONING

RELATED APPLICATIONS

This application is a continuation of U.S. application Ser. No. 11/033,930, filed Jan. 12, 2005, now U.S. Pat. No. 7,342,925 which claimed priority of Provisional Ser. No. 60/631,633 filed Nov. 30, 2004.

BACKGROUND

This invention relates to communication over the Internet, and more particularly to establishing IP addresses for subscriber devices.

Internet Service Providers (ISPs) supply a public IP address upon request to a subscriber's IP device (e.g., PC NIC card). This request is most commonly made at startup of the IP device, when the device sends a Dynamic Host Configuration Protocol (DHCP) Broadcast Discover message, requesting IP Address offers from any DHCP server that is listening. In response to the DHCP Broadcast Discover message one or more DHCP Offer messages are received at the subscriber's IP device, the IP device chooses the offer of one of the responding servers, and sends a DHCP Request message to the chosen server. The chosen server sends back an Acknowledgement (ACK) message, and communication thereafter proceeds.

Cable companies that offer Internet access through cable modems bridge DHCP Discover messages that are received by a modem onto a Data Over Cable System Interface Specification (DOCSIS) channel, where the cable modem identifies itself to a cable modem termination system (CMTS) by providing its Media Access Control (MAC) address. The CMTS thus receives both the DHCP Discover message from an IP device that is connected to the cable modem and the cable modem's MAC address. When a subscriber's IP device, such as a PC, connects to the cable company's ISP server, the cable company can therefore establish a correspondence between the MAC address of the subscriber's cable modem and the MAC address of the subscriber's IP device. Thereafter, knowing the MAC address that is expected to be found in DHCP Discover messages coming from the subscriber's cable modem, a cable company can choose to decline providing an IP address in response to a DHCP Discover message with an unexpected MAC address. Declining to provide an IP address is a measure of security that prevents an interloper's IP device from obtaining service. Consequently, however, when a legitimate subscriber wants to change the IP device or add an interposed device, the subscriber needs to contact the ISP (e.g., by telephone), and have the ISP clear the existing MAC addresses association, so that a new association can be established.

The fact that anytime the subscriber wants to add a new IP end-device such as a new PC, a home-router, or some other device, the subscriber needs to contact the ISP represents a significant inconvenience. A solution is to mimic, or clone, the MAC address of the old device in the new end-device, but this also presents a hassle for the subscriber because currently available devices need to be manually configured to perform such cloning.

SUMMARY

An advance in the art is achieved in an arrangement where the device that is known to the ISP is communicating with the ISP through an interposed device that is not known to the ISP by having the interposed device automatically clone the known device's MAC address in its communications with the ISP. This is achieved by the interposed device capturing the MAC address of the known device at startup and employing the captured MAC address in all standard packets that are sent to the ISP.

BRIEF DESCRIPTION OF THE DRAWING

FIG. 2 presents an alternate messages flow chart; and

DETAILED DESCRIPTION

Many ISPs track a user's MAC address as a crude security measure, but the idea of cloning a MAC address has made this security measure more of a hassle than an effective measure. Home Router manufacturers embraced the idea of cloning in order to keep their buyers from having to reset this MAC with the ISP. However, the subscriber has to locate and identify the MAC address of his or her PC, and use this information to manually set up cloning in the router. To a novice this setup can be challenging, and circumventing it would provide a much better customer experience.

The present disclosure relates to an arrangement where a subscriber's PC (or other IP device) has already been configured to work with the ISP, and where the subscriber interposes a new device between the subscriber's PC and the cable modem. Home Routers (HR), Media Terminal Adapters, and Telephone Adapters are examples of such interposed devices, each possessing its own MAC address.

Although interposed devices have their own MAC addresses, to meet the objective of this invention an interposed device needs to automatically assume the MAC address of the PC that is already known to the ISP's server whenever the interposed device communicates with the ISP server.

Figure 1:
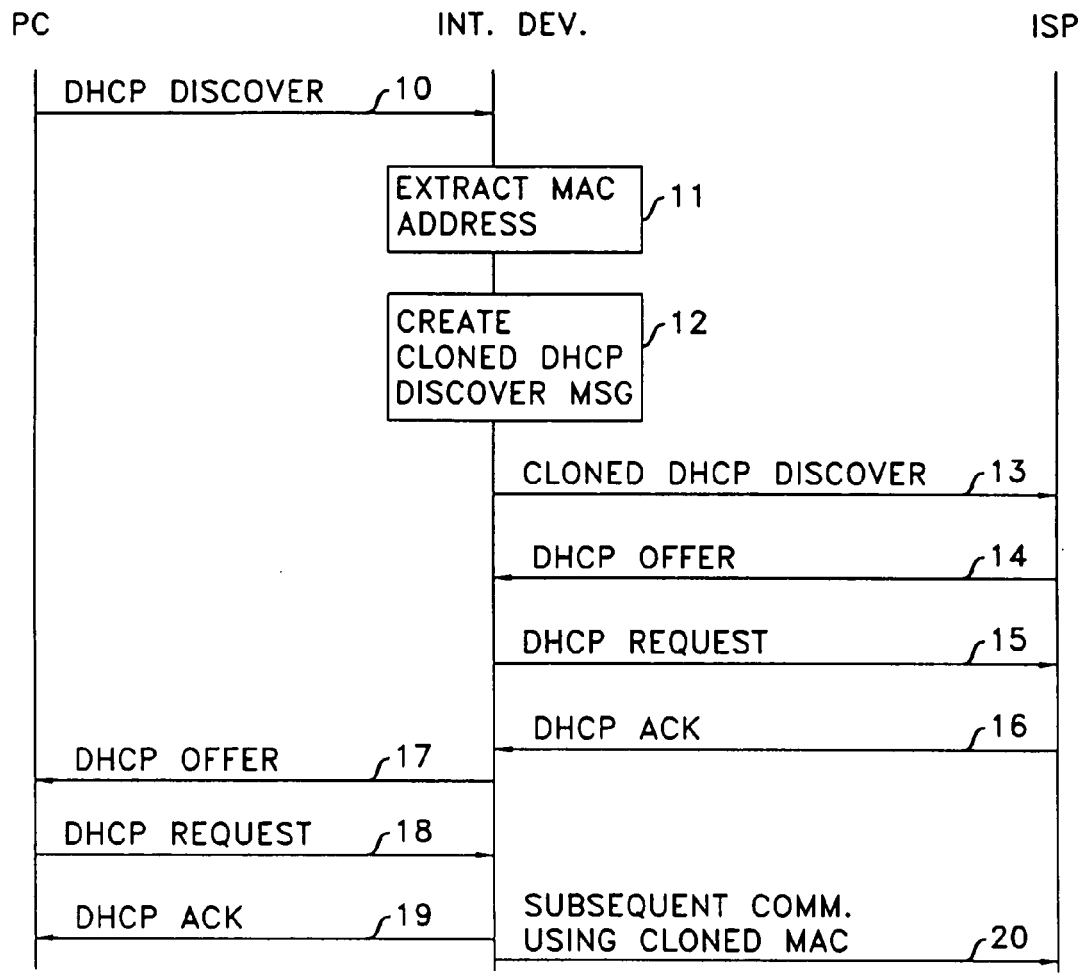
FIG. 1 presents a messages flow chart in accord with the principles disclosed herein.

In accordance with the illustrative approach depicted in FIG. 1, when the user's IP device is powered on at step 10, the TCP/IP interface of the IP device sends out a DHCP Discover message to acquire an IP address. It is a request to receive an IP address by selecting from one or more DHCP Offer messages that might arrive from listening DHCP servers. In step 11 the interposed device captures the DHCP Discover message and extracts therefrom the MAC address. In step 12 the interposed device creates its own DHCP Discover message, places the MAC address that was extracted from the DHCP Discover message sent by the IP device instead of its own MAC address, and in step 13 forwards the modified DHCP Discover message to the ISP. In step 14 the ISP sends to the interposed device a DHCP Offer message containing a public IP address and a DNS address, in step 15 the interposed device sends a DHCP Request message to the ISP, which effectively confirms its acceptance of the offered IP address, and in step 16 the ISP sends an ACK message, confirming the IP address that will be used. Thereafter, according to step 20 communication proceeds between the interposed device and the ISP, with the continued use of the cloned MAC address. The continued use of the cloned MAC address prevents an ISP from raising an alarm should it choose—in the course of the communication session—to check the MAC address of the device with which it is communicating.

Following step 16, or concurrently therewith, at step 17 the interposed device sends a DHCP Offer message to the subscriber's IP device, offering to the IP device a private IP address, and at steps 18-19 the interposed device and the IP device complete the IP acquisition protocol vis-à-vis the private IP address in the conventional manner described above.

FIG. 2 shows a slightly different approach. Specifically, as soon as the interposed device receives the initial DHCP Discover message in step 21, in step 22 it immediately offers the subscriber's IP device a private IP address, but with no DNS listed. The offer contains a very short lease time; for example, 10 sec. In step 23 the IP device follows up with the DHCP Request (since this is the only offer it received), and the interposed device completes the transaction with a DHCP ACK message in step 24.

The interposed device then turns to its task of establishing a connection to the ISP, extracts the MAC address of the IP device in step 11, creates its own DHCP Discover message with its MAC address replaced with the extracted MAC address of the IP device in step 12, and presents its created DHCP Discover message (with the cloned MAC address) to the ISP in step 13.

In the illustrative signal flow chart of FIG. 2, the lease time for the private IP address provided to the IP device expires shortly after the interposed device sends its created DHCP Discover message to the ISP. When the lease time thus expires, in step 25 the IP device sends a DHCP Request Renew message to the interposed device, asking to renew the lease. Since the interposed device has not yet received an IP address from the ISP, the interposed device sends a DHCP ACK message to the IP device in step 26, renewing the lease for another short interval.

Eventually, the communication between the interposed device and the ISP (steps 14, 15, and 16) completes, and the interposed device is in possession of a public IP address and DNS address. Thereafter, when the IP address lease of the IP device expires again and the IP device sends a DHCP Request Renew message in step 27, the interposed device responds in step 28 with a DHCP NACK message that denies use by the IP device of the previously provided private IP address. Having received a negative acknowledgement message, the subscriber's IP device sends a new DHCP Discover message in step 29, in response to which in step 30 the interposed device sends a DHCP Offer message that is complete with DNS address(es), and the same or a different private IP address. The IP device then sends a DHCP Request message in step 31, and the interposed device responds with a DHCP ACK message in step 32.

Figure 3:
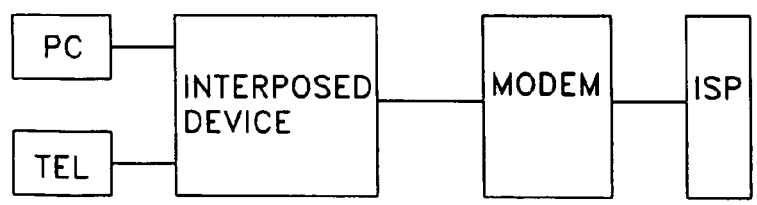
FIG. 3 shows an arrangement of an interposed device that supports both a PC and an IP telephone.

The interposed device can be viewed to have an upstream side that is connected to the ISP through a modem, and a downstream side that is connected to a subscriber's IP device with a MAC address that is known to the ISP. On the upstream side the interposed device behaves like a client relative to the ISP. On the downstream side the interposed device behaves like a server relative to the subscriber's IP device, and any other device that is connected to the interposed device on the downstream side thereof, such as illustrated for example in FIG. 3 where a PC and a telephone are connected to the downstream side of the interposed device. For sake of simplicity, it is assumed that the telephone shown in FIG. 3 is an IP device. Of course, the shown telephone can be a conventional POTS telephone if the circuitry that is necessary for converting it to an IP device is included within the interposed device.

It is noted that the above-disclosed approach requires the PC with the MAC address that is known to the ISP to send a DHCP Discover message to the interposed device before any other of the IP devices that are connected to the downstream side of the interposed device. When this is done, other devices can send their own DHCP Discover message, obtain their own private IP address from the interposed device and communicate in a conventional manner. It is noted, however, that the communication with the ISP, as far as the ISP is concerned, is with the PC that is known to the ISP because, as shown in step 20 of both FIG. 1 and FIG. 2, subsequent communication from the interposed device to the ISP is with packets that employ the cloned MAC address.

The above discloses two illustrative approaches for automatically cloning the MAC address of a device that is known to an ISP, but it should be realized that other approaches can be implemented without departing from the spirit and scope of this invention. To illustrate, the private IP address that is provided to the PC (sans a DNS address) is shown in FIG. 2 to be provided immediately upon receipt DHCP Discover message 21, but it could just as validly be provided sometime later, such as after the MAC address is extracted.

The invention claimed is:

1. Apparatus including a plurality of user-side connection points, each adapted to interface with a user device, and a network-side connection point adapted to interact, through an interface medium, with an Internet Service Provider (ISP), characterized by:
  a first module that is not known to the ISP which, responsive to receiving a Dynamic Host Configuration Protocol (DHCP) Broadcast Discover message from one of said user-side connection points, which message includes a Media Access Control (MAC) address of a device connected to said one of said user-side connection points creates, sends to the ISP a new DHCP Broadcast Discover message that includes a captured MAC address that is other than the MAC address of the received DHCP Broadcast Discover message.

2. The apparatus of claim 1 further comprising its own MAC address and the MAC address included in the captured MAC address is other than the MAC address of the apparatus.

3. The apparatus of claim 1 where the interface medium is a modem connected to a packet network.

4. The apparatus of claim 1 where the captured MAC address is a MAC address of a DHCP Broadcast Discover Message that was previously received from one of said devices that is connected to one of said user-side connection points, which device (primary user device) is known to said ISP.

5. The apparatus of claim 1 further comprising a second module that when said received DHCP Broadcast Discover message is from one of said user devices (primary user device) that is known to the ISP, extracts the MAC address of the received DHCP Broadcast Discover message and installs the extracted MAC address in said apparatus as the captured MAC address.

6. The apparatus of claim 5 where said second module extracts said MAC address when said primary user device sends said DHCP Broadcast Discover message as it is first powered up.

7. The apparatus of claim 1 where said first module:

interacts with said ISP in accord with a protocol that is initiated by the sending of the created DHCP Discovery message to said ISP, and which protocol results in an acknowledged public IP address and a DNS address being available; and sends a DHCP Offer message to said user device, offering a private IP address for communication between said user device and said apparatus; and communicates with said ISP with packets that carry said extracted MAC address.

8. The apparatus of claim 7 where said first module sends the DHCP Offer message to said device following receipt of said public IP address.

9. The apparatus of claim 7 where said first modules sends the DHCP Offer message to said device prior to sending of the created DHCP Discovery message.

* * * * *